United States Patent
Murakami et al.

(10) Patent No.: US 6,745,885 B2
(45) Date of Patent: Jun. 8, 2004

(54) POWER DISTRIBUTION CONTROL APPARATUS FOR FOUR-WHEEL DRIVE VEHICLE AND A METHOD FOR CONTROLLING THE APPARATUS

(75) Inventors: Tsuyoshi Murakami, Kariya (JP); Akihiro Ohno, Kariya (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/284,338

(22) Filed: Oct. 31, 2002

(65) Prior Publication Data

US 2003/0079954 A1 May 1, 2003

(30) Foreign Application Priority Data

Oct. 31, 2001 (JP) .................................. 2001-334765

(51) Int. Cl.$^7$ ............................................. B60K 41/00
(52) U.S. Cl. ............... 192/82 T; 180/249; 192/103 R
(58) Field of Search ................... 192/82 T, 103 R, 192/49; 180/233, 248, 249

(56) References Cited

U.S. PATENT DOCUMENTS

| | | | |
|---|---|---|---|
| 4,899,859 A | * | 2/1990 | Teraoka ..................... 192/221 |
| 6,035,988 A | * | 3/2000 | Ito et al. ..................... 192/82 T |
| 6,578,685 B2 | * | 6/2003 | Porter ........................ 192/35 |
| 2003/0150685 A1 | * | 8/2003 | Lida et al. ................ 192/82 T |

* cited by examiner

Primary Examiner—Saul Rodriquez
(74) Attorney, Agent, or Firm—Oblon, Spivak, McClelland, Maier & Neustadt, P.C.

(57) ABSTRACT

A power distribution control apparatus determines a command value that corresponds to the driving state of a four-wheel drive vehicle. The vehicle includes a pair of front wheels and a pair of rear wheels, and a coupling device that changes the power distribution to the front wheels and the rear wheels. The control apparatus detects the differential rotation speed between the average rotation speed of the front wheels and the average rotation speed of the rear wheels. The control apparatus estimates the exothermic energy generated in the coupling device based on the product of the differential rotation speed and the command value. The control apparatus determines an optimum drive mode for the four-wheel drive vehicle based on the estimated exothermic energy and for selecting map data corresponding to the determined drive mode. The control apparatus determines the command value that corresponds to the driving state by using the map data.

21 Claims, 4 Drawing Sheets

POWER DISTRIBUTION CONTROL APPARATUS FOR FOUR-WHEEL DRIVE VEHICLE AND A METHOD FOR CONTROLLING THE APPARATUS

BACKGROUND OF THE INVENTION

The present invention relates to a power distribution control apparatus for a four-wheel drive vehicle.

Four-wheel drive vehicles include part-time four-wheel drive vehicles, full-time four-wheel drive vehicles, and standby four-wheel drive vehicles. A part-time four-wheel drive vehicle switches between four-wheel drive and two-wheel drive as needed. A full-time four-wheel drive vehicle constantly drives the four wheels. A standby four-wheel drive vehicle automatically switches between four-wheel drive and two-wheel drive.

A typical standby four-wheel drive vehicle has a transaxle including a transmission and a transfer. The transaxle transmits power of the engine to the front wheels through a pair of front axles. The transaxle transmits power of the engine to a power coupling device through a propeller shaft. The coupling device is coupled to a rear differential with a drive pinion shaft. The rear differential is coupled to the rear wheels with a pair of rear axles.

A typical coupling device includes an electromagnetic clutch mechanism of a multi-plate wet type. The clutch mechanism includes several clutch disks. When electricity is supplied to an electromagnetic coil in the clutch mechanism, the clutch disks are engaged with one another, which permits the power of the engine to be transmitted to the rear differential through the propeller shaft. The power transmitted to the rear differential is transmitted to the rear wheels through the rear axles. The frictional force among the clutch disks is determined by the amount of current supplied to the electromagnetic coil. The greater the frictional force is, the greater the power transmitted to the rear wheels is. In a standby four-wheel drive vehicle, a power distribution control apparatus for controlling the coupling device controls the frictional force of the electromagnetic clutch, thereby selecting one of four-wheel drive and two-wheel drive. The control apparatus also determines the power distribution between the front wheels and the rear wheels in the four-wheel drive.

The control apparatus controls the frictional force of the electromagnetic clutch mechanism based on a limited-slip differential torque map, which is prepared in advance. The torque map is a map table defining the value of current supplied to the electromagnetic coil to obtain a target frictional force. The target frictional force is set to optimize the power distribution for the driving state.

Specifically, the difference between the average rotation speed of the front wheels and the average rotation speed of the rear wheels, the opening degree of the throttle valve, and the vehicle speed are detected by corresponding sensors, and are used for obtaining the driving state. The control apparatus computes a command value based on the parameters detected by the sensors by referring to the map table, and controls the current to the electromagnetic coil based on the command value. Accordingly, the control apparatus controls the frictional force in the electromagnetic clutch mechanism to be a target value to optimize the power distribution for the current driving state. This permits the vehicle to run in a stable manner.

If the front wheels or rear wheels of a standby four-wheel drive vehicle is caught in sand, the caught wheels race due to lack of traction between the wheels and the ground. In other words, the vehicle is stuck in the sand. This increases the differential rotation speed between the front wheels and the rear wheels. If the differential rotation speed is above a predetermined threshold value over a predetermined period, the control apparatus determines that there is not sufficient traction, and performs a maximum torque control to maximize the frictional force of the electromagnetic clutch mechanism. The maximum torque control increases the traction to a sufficient level and permits the vehicle to escape the stuck condition.

However, in some cases, maximum torque control cannot increase the traction to a sufficient level and the vehicle cannot escape the stuck condition. In such a case, the control apparatus performs the maximum torque control for an extended period. An extended maximum torque control causes the clutch disks to be heated by friction, and excessive heat can damage the clutch disks.

Therefore, if the differential rotation speed between the front wheels and the rear wheels is not fall below the predetermined threshold value when a predetermined period has elapsed from when the maximum torque control is started, the vehicle is switched to two-wheel drive control to set the frictional force in the clutch mechanism to zero, thereby preventing the clutch disks from being damaged. This temporarily cools the heated clutch mechanism, and the clutch disks are prevented from being damaged.

In some cases, the vehicle remains in the two-wheel drive control for some time after the clutch disks of the clutch mechanism are sufficiently cooled and does not immediately return to the maximum torque control. As a result, the power distribution is not optimized. The vehicle therefore cannot smoothly escape the stuck condition.

In the maximum torque control for escaping the stuck condition, the front wheels are directly coupled to the rear wheels with the propeller shaft. In this case, a tight corner braking phenomenon occurs if the vehicle turns a corner due to unabsorbed difference between the speeds of the front wheels and the rear wheels.

SUMMARY OF THE INVENTION

Accordingly, it is an objective of the present invention to provide a power distribution control apparatus that prevents clutch disks from being damaged by heat, accurately distributes power, and guarantees a stable driving.

To achieve the above objects, one aspect of the present invention provides a power distribution control apparatus for a four-wheel drive vehicle. The vehicle includes a pair of front wheels and a pair of rear wheels, the wheels being driven by an engine, and a coupling device that changes the power distribution to the front wheels and the rear wheels. The front wheels or the rear wheels are first wheels that are coupled to the engine without the coupling device in between. The other wheels are second wheels that are coupled to the engine through the coupling device. The apparatus determines a command value that corresponds to the driving state of the vehicle. The frictional force of the coupling device determines the power distribution ratio to the first wheels and the second wheels. The frictional force of the coupling device is changed based on the command value. The apparatus includes detecting means, estimating means and determining means. The detecting means detects the differential rotation speed between the rotation speed of the front wheels and the rotation speed of the rear wheels. The estimating means for estimating the exothermic energy generated in the coupling device based on the product of the differential rotation speed and the command value. The selecting means determines an optimum drive mode for the four-wheel drive vehicle based on the estimated exothermic energy and for selecting map data corresponding to the determined drive mode. The determining means determines the command value that corresponds to the driving state by using the map data.

Another aspect of the present invention provides a method for controlling a power distribution control apparatus for a four-wheel drive vehicle. The vehicle includes a pair of front wheels and a pair of rear wheels, the wheels being driven by an engine, and a coupling device that changes the power distribution to the front wheels and the rear wheels. The front wheels or the rear wheels are first wheels that are coupled to the engine without the coupling device in between. The other wheels are second wheels that are coupled to the engine through the coupling device. The apparatus determines a command value that corresponds to the driving state of the vehicle. The frictional force of the coupling device determines the power distribution ratio to the first wheels and the second wheels. The frictional force of the coupling device is changed based on the command value. The method includes detecting the differential rotation speed between the rotation speed of the front wheels and the rotation speed of the rear wheels; estimating the exothermic energy generated in the coupling device based on the product of the differential rotation speed and the command value; determining an optimum drive mode for the four-wheel drive vehicle based on the estimated exothermic energy and selecting map data corresponding to the determined drive mode; and determining the command value that corresponds to the driving state by using the map data.

Other aspects and advantages of the invention will become apparent from the following description, taken in conjunction with the accompanying drawings, illustrating by way of example the principles of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A standby four-wheel drive vehicle 1 according to one embodiment of the present invention will now be described with reference to FIGS. 1 to 4. The front wheels are always driven when the vehicle 1 is running.

Figure 1:
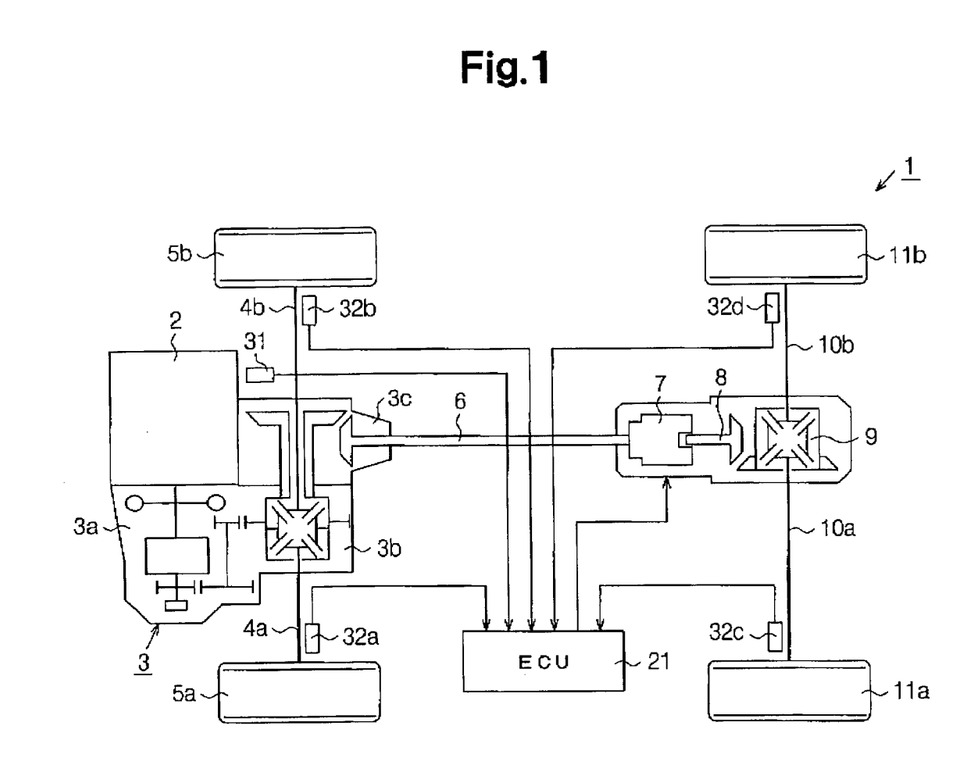
FIG. 1 is a schematic plan view showing a four-wheel drive vehicle according to one embodiment of the present invention.

FIG. 1 is a schematic view showing the four-wheel drive vehicle 1 according to this embodiment. As shown in FIG. 1, the four-wheel drive vehicle 1 has an internal combustion engine, which is an engine 2, and a transaxle 3. The transaxle 3 includes a transmission 3a, a front differential 3b, and a transfer 3c. Left and right front axles 4a, 4b are coupled to the front differential 3b. Left and right front wheels 5a, 5b are coupled to the front axels 4a, 4b, respectively. The power of the engine 2 is transmitted to the left and right front wheels 5a, 5b through the transmission 3a, the front differential 3b and the front axles 4a, 4b.

A propeller shaft 6 is coupled to the transfer 3c. The propeller shaft 6 is coupled to a power coupling device 7. The power of the engine 2 is transmitted to the power coupling device 7 through the transmission 3a, the transfer 3c, and the propeller shaft 6. The power coupling device 7 is coupled to a rear differential 9 through a drive pinion shaft 8. Left and right rear axles 10a, 10b are coupled to the rear differential 9. Left and right rear wheels 11a, 11b are coupled to the rear axles 10a, 10b, respectively.

The power coupling device 7 includes an electromagnetic clutch mechanism of a multi-plate wet type. The electromagnetic clutch mechanism includes an electromagnetic coil 7a (see FIG. 2) and several clutch disks. The clutch disks are selectively engaged. An electronic control unit (ECU) 21, which will be discussed below, supplies a current to the electromagnetic coil 7a based on a command signal (command value I). In accordance with the value of the supplied current, the electromagnetic coil 7a engages the clutch disks to transmit power from the propeller shaft 6 to the drive pinion shaft 8.

Specifically, the power transmitted from the propeller shaft 6 (the engine 2) to the drive pinion shaft 8 (the left and right rear wheels 11a, 11b) is determined by the frictional force of the clutch disks. The transmitted power is increased as the frictional force is increased. The frictional force is, in turn, determined according to the current value supplied to the electromagnetic coil 7a. That is, the power coupling device 7 controls the frictional force thereby selecting four-wheel drive and two-wheel drive. In the four-wheel drive, the power coupling device 7 controls the power distribution between the front wheels 5a, 5b and the rear wheels 11a, 11b.

The electric configuration of a power transmission circuit for controlling the power coupling device 7 will now be described.

Figure 2:
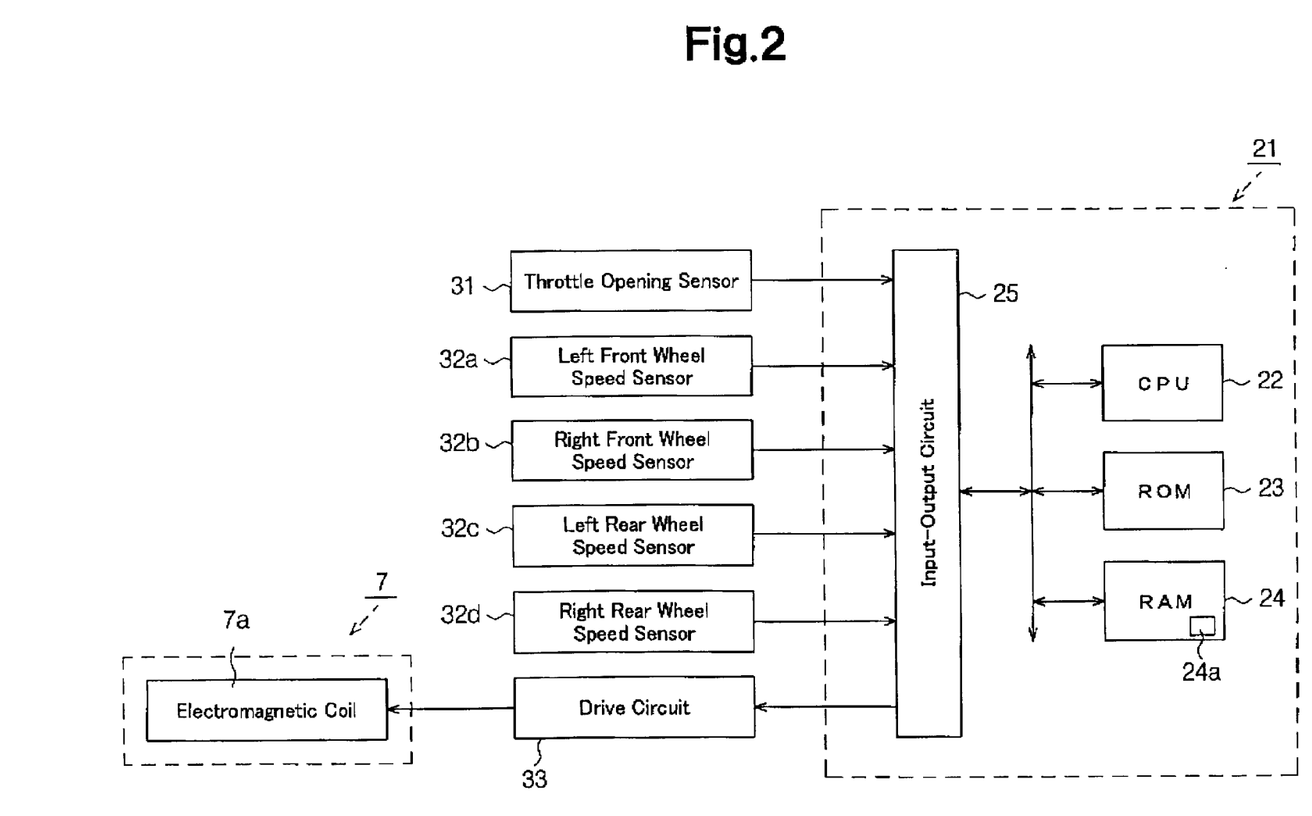
FIG. 2 is a circuit diagram showing a power transmission control circuit for driving a power transmission control apparatus of the four-wheel drive vehicle shown in FIG. 1.

As shown in FIG. 2, the power transmission control circuit includes the ECU 21. The ECU 21 includes exothermic energy estimating means, map data selecting means, a ROM 23, a RAM 24, and an input-output circuit 25. In this embodiment, the map data selecting means is a CPU 22 in this embodiment. The CPU 22 controls the power coupling device 7 according to programs stored in the ROM 23. That is, the CPU 22 executes computations for controlling the current supplied to the electromagnetic coil 7a. The ROM 23 stores programs for controlling the current supplied to the electromagnetic coil 7a of the power coupling device 7, various data, and various map data. The RAM 24 temporarily stores computation results of the CPU 22 and stores various data.

The programs stored in the ROM 23 include a basic control program, a switch flag computation program, and a drive mode selecting program. The drive modes of the coupling device 7 include a first four-wheel drive mode, a two-wheel drive mode, and a second four-wheel drive mode. In the two-wheel drive mode, only the front wheels are driven. In the first and second four-wheel drive modes, power distribution to the front and rear wheels are varied. In the same driving state, the power distribution ratio to the front wheels and the rear wheels is closer to the equalized state in the first four-wheel drive mode than in the second four-wheel drive mode. In each of the three drive modes, the basic control program is executed for computing the current value supplied to the electromagnetic coil 7a that corresponds to the current driving state, and for controlling the current to the coil 7a with the computed current value.

The switch flag computation program is executed for estimating the exothermic energy U generated at the clutch mechanism of the power coupling device 7 based on the current driving state, and for selecting the value of a switch flag from 0, 1 and 2 based on the computation result.

Further, the drive mode selecting program is executed for selecting one of the three drive modes based on the value of the switch flag selected in the switch flag computation program. If the switch flag is zero, the second four-wheel drive mode is selected. If the switch flag is one, the first four-wheel drive mode is selected. If the switch flag is two, the second drive is selected.

Figure 4:
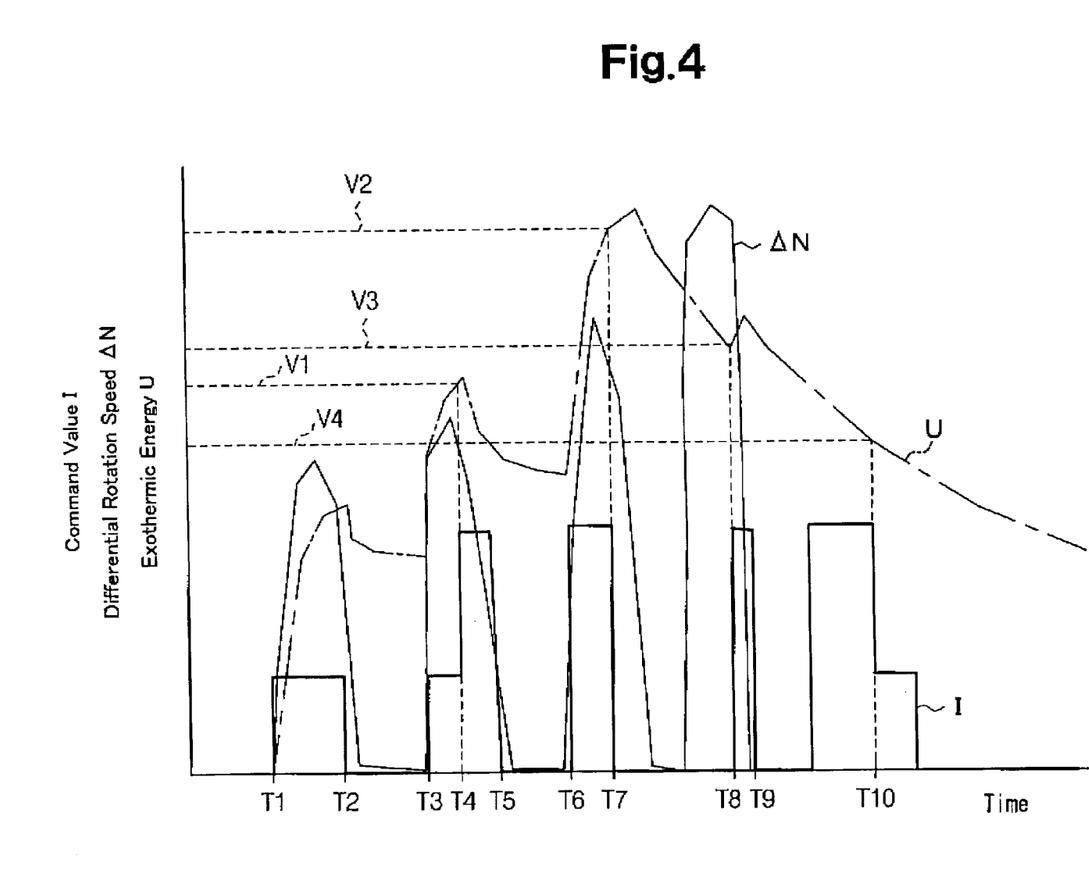
FIG. 4 is a graph showing an example of changes of a command value I, a differential rotation speed ΔN, and an exothermic energy U.

The data stored in ROM 23 include threshold data. The threshold data includes a first threshold value V1, or a first temperature rise threshold value, a second threshold value V2, or a second temperature rise threshold value, a third threshold value V3, or a first temperature drop threshold value, and a fourth threshold value V4, or a second temperature drop threshold value. As shown in FIG. 4, the fourth threshold value V4 is the smallest, and the values increase in the order of V4, V1, V3, and V2. After reading the threshold values V1 to V4, the CPU 22 estimates the exothermic energy U according to the switch flag computation program. The CPU 22 compares the threshold values V1 to V4 with the exothermic energy U. Based on the comparison result, the CPU 22 selects the value of the switch flag from 0, 1, and 2.

The map data stored in the ROM 23 include a drive mode map and a gain map. The drive mode map is used in the first and second four-wheel drive modes of the three drive modes. The drive mode map data are map data for computing the command value I. The command value I is controlled such that a target frictional force is obtained. The target frictional force optimizes the power distribution ratio for the current driving state.

In this embodiment, the driving state includes parameters such as the differential rotation speed $\Delta N$ between the average speed of the front wheels 5a, 5b and the average speed of the rear wheels 11a, 11b, the opening degree of the throttle valve, and the vehicle speed.

The difference between the drive map data used in the first four-wheel drive mode and the drive map data used in the second four-wheel drive mode is that, in a given driving state, the frictional force in the coupling device 7 is greater when the coupling device 7 is controlled according to the first four-wheel drive mode than when the device 7 is controlled according to the second four-wheel drive mode. Therefore, the exothermic energy U is smaller when the coupling device 7 is controlled according to the second four-wheel drive mode than when the device 7 is controlled by the first four-wheel drive mode. The-difference of the exothermic energy U is due to the difference of the power distribution ratio.

When the power coupling device 7 is controlled according to the two-wheel drive mode, the frictional engaging amount is zero, and therefore, the exothermic energy U is also zero.

The gain map is used for obtaining exothermic gain K1 and endothermic gain K2, which are used for estimating the exothermic energy U. The heat radiation gain K1 is a coefficient for obtaining the heat radiation energy naturally dissipated from the exothermic energy U as time elapses.

The endothermic gain K2 is a coefficient for obtaining the endothermic energy added to the exothermic energy U due to frictional heat of the electromagnetic clutch mechanism. The heat radiation gain K1 and the endothermic gain K2 vary depending on parameters such as the driving state, the road condition, and the outside temperature. The gain maps are used for obtaining the gains K1, K2 that are suitable for the parameters. The gain maps are obtained in advance through experiments or is theoretically computed. The gain maps are stored in the ROM 23.

The RAM 24 has a switch flag memory section 24a. The switch flag memory section 24a stores the value of the switch flag, which has been selected from 0, 1 and 2 in the switch flag computation program. According to the drive mode selecting program, the CPU 22 reads the value of the switch flag form the switch flag memory section 24a to select one of the first four-wheel drive mode, the second four-wheel drive mode, and the two-wheel drive mode.

The CPU 22 is connected to a throttle opening sensor 31 through the input-output circuit 25 and receives the throttle opening degree signal from the throttle opening sensor 31. The throttle opening sensor 31 is located at the throttle valve to detect the opening degree of the throttle valve. The CPU 22 computes the current opening degree of the throttle valve (throttle opening) based on the detection signal sent from the throttle opening sensor 31.

The CPU 22 is connected to wheel speed sensors 32a to 32d through the input-output circuit 25. The wheel speed sensors 32a to 32d detect the speed the wheels 5a, 5b, 11a, and 11b, respectively. The CPU 22 receives detection signals from the wheel speed sensors 32a to 32d. Based on the signals from the wheel speed sensors 32a to 32d, the CPU 22 computes the current wheel speeds VFL, VFR, VRL, and VRR of the wheels 5a, 5b, 11a and 11b, respectively. The CPU 22 obtains the average front wheel speed VFN (VFN=(VFL+VFR)/2) based on the wheel speeds VFL, VFR of the front wheels 5a, 5b. The CPU 22 also obtains the average rear wheel speed VRN (VRN=(VRL+VRR)/2) based on the wheel speeds VRL, VRR of the rear wheels 11a, 11b. Further, the CPU 22 computes the differential rotation speed $\Delta N$ ($\Delta N=|VFN-VRN|$) based on the average front wheel speed VFN and the average rear wheel speed VRN.

The CPU 22 is connected to a drive circuit 33 through the input-output circuit 25. The drive circuit 33 supplies current to the electromagnetic coil 7a of the drive coupling device 7. The CPU 22 computes a current value and supplies a control signal of a command value I to the drive circuit 33 so that the drive circuit 33 supplies the current value corresponding to the command value I to the electromagnetic coil 7a. The drive circuit 33 operates based on the control signal of the command value I and supplies the current value computed by the CPU 22 to the electromagnetic coil 7a.

That is, by using the maps of the three drive modes, the CPU 22 obtains the command value I. The command value I represents a target current value of the current supplied to the electromagnetic coil 7a that correspond to the throttle opening degree, the differential rotation speed $\Delta N$, and the vehicle speed. The CPU 22 outputs the computed command value I to the drive circuit 33 through the input-output circuit 25.

The operation of the power transmission control circuit for controlling the power coupling device 7 will now be described.

Figure 3:
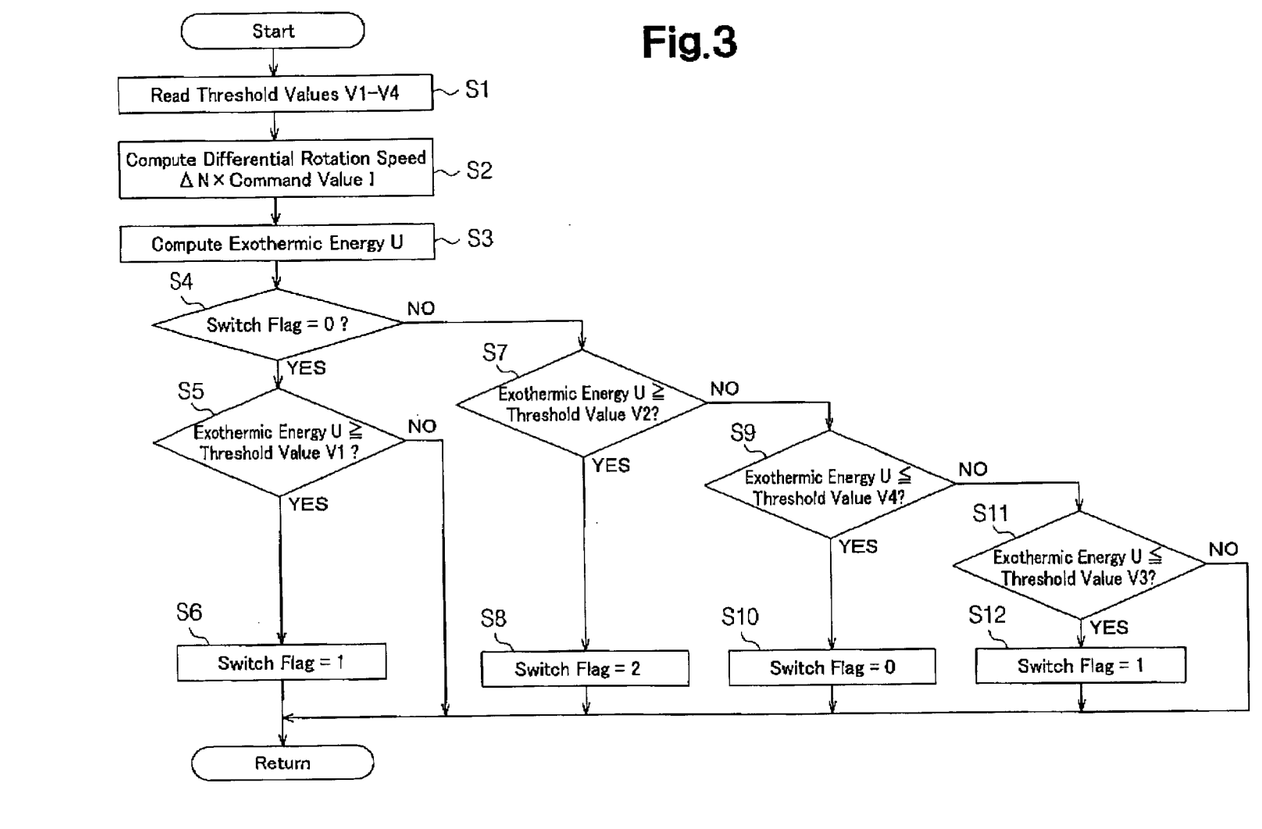
FIG. 3 is a flowchart showing a procedure for computing a switch flag.

The CPU 22 executes the following process for computing the switch flag according to the flowchart of FIG. 3 at predetermined intervals. At this time, the four-wheel drive vehicle 1 is controlled to operate in one of the three drive modes by the CPU 22.

In step S1, the CPU 22 reads threshold values V1 to V4 from the ROM 23 according to the switch flag computation program. Based on the detection signals from the wheel speed sensors 32a, 32d, the CPU 22 computes the differential rotation speed $\Delta N$. At the same time, the CPU 22 reads the command value I of the current that is currently supplied to the electromagnetic coil 7a. In step S2, the CPU 22 computes the product of the command value I and the differential rotation speed $\Delta N$.

Next, based on the parameters such as the current driving state, the state of the road surface, and the outside temperature, the CPU 22 computes the values of the heat radiation gain K1 and the endothermic gain K2 that correspond to the parameters by referring to the gain map data stored in the ROM 23. By using the computed gains K1, K2 and the product of the differential rotation speed $\Delta N$ and the command value I, the CPU 22 estimates the exothermic energy U according to the following equation. The value of the exothermic energy U that is computed prior to the current process will be referred to the previous exothermic energy U0.

$$U=U0\times(I-K1)+\Delta N\times I\times K2$$

That is, the current exothermic energy U is estimated in step S3 by subtracting the energy radiated from the last process to the current process (U0×K1) from the previous exothermic energy U0, and adding the endothermic energy from the last process to the current process ($\Delta N\times I\times K2$).

Then, the CPU 22 reads the value of the switch flag currently stored in the switch flag memory section 24a of the RAM 24. In step S4, the CPU 22 determines whether the read value of the switch flag is zero. That is the CPU 22 determines whether the drive mode is the second four-wheel drive mode. If the value of the switch flag is zero, or if the outcome of the step S4 is positive, the CPU 22 proceeds to step S5. In step S5, the CPU 22 determines whether the exothermic energy U is equal to or more than the threshold value V1.

If the exothermic energy U is equal to or greater than the threshold value V1, or if the outcome of step S5 is positive, the CPU 22 proceeds to step S6 and sets the switch flag to one. In other words, the CPU 22 sets the drive mode to the first four-wheel drive mode. If the exothermic energy U is less than the threshold value V1, or if the outcome of step S5 is negative, the CPU 22 terminates the switch flag computation. In this case, the CPU 22 stands by until the next cycle of the switch flag computation.

That is, if the exothermic energy U exceeds the threshold value V1 during the second four-wheel drive mode, the CPU 22 determines that the differential rotation speed $\Delta N$ and the command value I are increased due to, for example, wheels being stuck, and that the exothermic energy U at the coupling device exceeds the threshold value V1, accordingly. Then, the CPU 22 switch the drive mode to the first four-wheel drive mode to eliminate the problem such as the wheels being stuck, thereby increasing the traction between the wheels and the ground. If the exothermic energy U is less than the threshold value V1, the CPU 22 determines that the four-wheel drive vehicle 1 is operating at the normal state and maintains the second tour-wheel drive mode.

If the value of the switch flag is not zero in step S4, or if the outcome of the step S4 is negative, the CPU 22 proceeds to step S7. In step S7, the CPU 22 determines whether the exothermic energy U is equal to or greater than the threshold value V2.

If the exothermic energy U is equal to or greater than the threshold value V2, or if the outcome of step S7 is positive, the CPU 22 proceeds to step S8 and sets the switch flag to two. In other words, the CPU 22 sets the drive mode to the two-wheel drive mode. If the CPU 22 determines that the exothermic energy U is less than threshold value V2 in step S7, or if the outcome of step S7 is negative, the CPU 22 proceeds to step S9.

That is, if the exothermic energy U exceeds the threshold value V2 while the drive mode is not the second four-wheel drive mode, that is, while the drive mode is either the first four-wheel drive mode or the two-wheel drive mode, the CPU 22 judges that the exothermic energy U is increased by the frictional heat of the clutch disks and that the clutch disks are likely to be damaged. Therefore, when the exothermic energy U exceeds the threshold value V2, the CPU 22 sets the drive mode to the two-wheel drive mode to give a higher priority to the prevention of damages to the clutch disks than to the compensation of traction shortage. Specifically, the frictional force of the clutch disks is reduced to zero so that no additional frictional heat is generated.

If the CPU 22 determines that the exothermic energy U is less than the threshold value V2, or if the outcome of step S7 is negative, the CPU 22 proceeds to step S9. In step S9, the CPU 22 determines whether the exothermic energy U is equal to or less than the threshold value V4.

If the exothermic energy U is equal to or less than the threshold value V4, or if the outcome of step S9 is positive, the CPU 22 proceeds to step S10 and sets the switch flag to zero. In other words, the CPU 22 sets the drive mode to the second four-wheel drive mode. If the CPU 22 determines that the exothermic energy U is greater than threshold value V4 in step S9, or if the outcome of step S9 is negative, the CPU 22 proceeds to step S11.

That is, if the exothermic energy U is equal to or less than the threshold value V4 while the drive mode is not the second four-wheel drive mode, that is, while the drive mode is either the first four-wheel drive mode or the two-wheel drive mode, the CPU 22 judges that the four-wheel drive vehicle 1 is operating in a stable manner. In this case, the CPU 22 switches the drive mode to the second four-wheel drive mode to improve the fuel economy.

If the CPU 22 determines that the exothermic energy U is greater than the threshold value V4, or if the outcome of step S9 is negative, the CPU 22 proceeds to step S11. In step S11, the CPU 22 determines whether the exothermic energy U is equal to or greater than the threshold value V3.

If the exothermic energy U is equal to or less than the threshold value V3, or if the outcome of step S11 is positive, the CPU 22 proceeds to step S12 and sets the switch flag to one. In other words, the CPU 22 sets the drive mode to the first four-wheel drive mode. If the exothermic energy U is greater than the threshold value V3 in step S11, or if the outcome of step S9 is negative, the CPU 22 terminates the switch flag computation. In this case, the CPU 22 stands by until the next cycle of the switch flag computation.

That is, if the exothermic energy U is equal to or less than the threshold value V3 while the drive mode is either the first four-wheel drive mode or the two-wheel drive mode, the CPU 22 judges that the differential rotation speed $\Delta N$ and the command value I are increased due to, for example, the wheels being stuck. At the same time, the CPU 22 judges that the exothermic energy U has not been increased to a level that damages the clutch disks. Therefore, when the exothermic energy U is equal to or less than the threshold value V3, the CPU 22 switches the drive mode to the first four-wheel drive mode to give a higher priority to the compensation of traction shortage than to the prevention of damages to the clutch disks, thereby increasing the traction between the wheels and the ground surface.

If the exothermic energy U is greater than the threshold value V3, the CPU 22 judges that the exothermic energy U is neither at a level that damages the clutch disks nor at a level to switch the two-wheel drive mode to the first four-wheel drive mode. In this case, the current drive mode, that is, the two-wheel drive mode or the first four-wheel drive mode, is maintained.

FIG. 4 shows an example of changes in the command value I, the differential rotation speed ΔN, and the exothermic energy U from time T1 to T10, or from when the four-wheel drive vehicle 1 gets stuck in the mud at the second four-wheel drive mode and the wheels start to race to when the vehicle 1 escapes the mud. The command value I is represented by a solid line, the differential rotation speed ΔN is represented by a broken line, and the exothermic energy U is represented by an alternate long and short dashed line.

At time T1 in FIG. 4, the drive mode of the four-wheel drive vehicle 1 is the second four-wheel drive mode, and the driver of the vehicle 1 depresses the acceleration pedal (not shown) to start the vehicle 1. The CPU 22 computes the command value I based on the map data of the second four-wheel drive mode and outputs the command signal of the command value I to the drive circuit 33. Accordingly, power is transmitted to the front and rear wheels 5a, 5b, 11a, and 11b. However, since the vehicle 1 is stuck in the mud, the vehicle 1 is not started and the differential rotation speed ΔN is increased. As the differential rotation speed ΔN is increased, the exothermic energy U of the power coupling device 7 is increased.

At time T2, the driver notices that the vehicle 1 cannot be started because the vehicle 1 is stuck in the mud and stops depressing the acceleration pedal. Then, the CPU 22 stops outputting the control signal of the command value I. As a result, the differential rotation speed ΔN becomes substantially zero. Accordingly, the exothermic energy U is slightly decreased.

At time T3, the driver depresses the acceleration pedal again to start the vehicle 1. The CPU 22 computes the command value I based on the map data of the second four-wheel drive mode. Accordingly, power is transmitted to the front and rear wheels 5a, 5b, 11a, and 11b. However, the vehicle 1 remains stuck, and the differential rotation speed ΔN is further increased. Also, the exothermic energy U is increased.

At time T4, the exothermic energy U exceeds the threshold value V1. The CPU 22 switches the drive mode to the first four-wheel drive mode according to the switch flag computation program. Then, based on the map data of the first four-wheel drive mode, the CPU 22 computes the command value I, which is greater than that of the two-wheel drive mode, thereby increasing the traction between the wheels and the ground.

However, at time T5, the driver judges that the vehicle 1 has not escaped from and remains stuck, and stops depressing the acceleration pedal. Then, the CPU 22 stops outputting the control signal of the command value I. As a result, the differential rotation speed ΔN becomes substantially zero, and the exothermic energy U is slightly decreased.

At time T6, the driver depresses the acceleration pedal again to start the vehicle 1. The CPU 22 computes the command value I based on the map data of the first four-wheel drive mode. Accordingly, power is transmitted to the front and rear wheels 5a, 5b, 11a, and 11b. However, the vehicle 1 remains stuck, and the differential rotation speed ΔN is further increased. Also, the exothermic energy U is increased.

At time T7, the exothermic energy U reaches the threshold value V2. The CPU 22 switches the drive mode to the two-wheel drive mode according to the switch flag computation program. Then, the CPU 22 sets the command value I to zero thereby stopping the generation of frictional heat of the clutch disks in the power coupling device 7. As a result, the exothermic energy U is decreased.

At time T8, the exothermic energy U drops to the threshold value V3, and the CPU 22 determines that the exothermic energy U is not at a level that is likely to damage the clutch disks, and switches the drive mode to the first four-wheel drive mode. The CPU 22 computes the command value I based on the map of the first four-wheel drive mode. Accordingly, power is transmitted to the front and rear wheels 5a, 5b, 11a, and 11b.

At time T9, the vehicle 1 has left the mud, and the differential rotation speed ΔN and the command value I becomes zero. Then, the exothermic energy U is decreased as time elapses. At time T10, the exothermic energy U drops to the threshold value V4. At this time, the CPU 22 determines that the vehicle 1 is operating in the normal state and switches the drive mode to the second four-wheel drive mode.

The above embodiment has the following advantages.

(1) The exothermic energy U generated in the power coupling device 7 is estimated by using the product of the differential rotation speed ΔN and the command value I. The optimal drive mode of the four-wheel drive vehicle 1 is determined based on the estimated exothermic energy U. Then, by using the map data corresponding to the determined drive mode, the command value I corresponding to the driving state is determined so that the power distributing is optimized.

Therefore, even if the frictional heat of the power coupling device 7 is likely to damage the power coupling device 7, the generation of frictional heat in the power coupling device 7 is prevented by switching the drive mode based on exothermic energy U, thereby preventing the power coupling device 7 from being damaged.

(2) The exothermic energy U generated by the power coupling device 7 is estimated based on the product of the differential rotation speed ΔN and the command value I. Therefore, compared to a case in which the frictional heat at the device 7 is detected by a sensor, the detection of the exothermic energy U has a better response and is easy.

(3) When the drive mode of the vehicle 1 is in the second four-wheel drive mode, the drive mode is switched to the first four-wheel drive mode if the exothermic energy U exceeds the threshold value V1.

If the vehicle 1 is stuck, for example, in the mud when in the second four-wheel drive mode, the differential rotation speed ΔN is increased. Therefore, by determining whether the exothermic energy U is equal to or greater than the threshold value V1, whether the vehicle 1 is stuck is determined. If the CPU 22 judges that the exothermic energy U is equal to or greater than the threshold value V1 and the vehicle 1 is stuck, the CPU 22 switches the drive mode to the first four-wheel drive mode to increase the traction between the wheels and the ground. This permits the vehicle 1 to easily escape the stuck state.

(4) To facilitate escape of the vehicle 1 from a stuck state, the drive mode is switched to the first four-wheel drive mode, in which the power distribution to the front and rear wheels are not equalized, but rather, the power distribution to the rear wheels is greater than that to the front wheels. Therefore, a tight corner braking phenomenon does not occur and the vehicle 1 is operated in a stable manner.

(5) When the drive mode of the vehicle 1 is the first four-wheel drive mode, the drive mode is switched to the two-wheel drive mode if the exothermic energy U reaches the threshold value V2.

If the driver tries to escape from a stuck state in the first four-wheel drive mode for an extended period, the exothermic energy U is increased and the power coupling device 7 is likely to be damaged. Whether the power coupling device 7 is likely to be damaged is determined based on whether the exothermic energy U is equal to or greater than the threshold value V2. If the CPU 22 determines that the exothermic energy U is equal to or greater than the threshold value V2, the CPU 22 switches the drive mode to the two-wheel drive mode so that the exothermic energy U is decreased. This prevents the power coupling device 7 from being damaged.

(6) When the drive mode of the vehicle 1 is the first four-wheel drive mode or the two-wheel drive mode, the drive mode is switched to the second four-wheel drive mode if the exothermic energy U drops below the threshold value V4.

If the vehicle 1 escapes a stuck state, the differential rotation speed ΔN is decreased. Therefore, by determining whether the exothermic energy U is equal to or less than the threshold value V4, whether the vehicle 1 has escaped from the stuck state and is operating in the normal state is determined. If the CPU 22 determines that the exothermic energy U is equal to or less than the threshold value V4, the CPU 22 switches the drive mode to the second four-wheel drive mode, which improves the fuel economy.

(7) When the drive mode of the vehicle 1 is the two-wheel drive mode, the drive mode is switched to the first four-wheel drive mode if the exothermic energy U is greater than the threshold value V4 and is equal to or less than the threshold value V3.

When the two-wheel drive mode is selected for preventing the coupling device 7 from being damaged by frictional heat, the exothermic energy U is decreased due to radiation and the device 7 is unlikely to be damaged. Also, whether the device 7 is unlikely to be damaged can be determined based on whether the exothermic energy U is equal to or less than the threshold value V3. If the exothermic energy U is equal to or less than the threshold value V3 and is greater than the threshold value V4, the CPU 22 switches the drive mode to the first four-wheel drive mode. Therefore, the vehicle 1, which has been unable to escape from the stuck state because of the operation for protecting the power coupling device 7, is easily pulled out of the stuck state.

The present invention may be embodied as follows.

In the illustrated embodiment, the command value for the first four-wheel drive mode may be obtained by multiplying the command value I obtained from the map data of the second four-wheel drive mode by an increase gain.

In the illustrated embodiment, when the value of the switch flag is two, the drive mode is switched to the two-wheel drive mode so that the only the front wheels are driven. However, when the value of the switch flag is two, the drive mode may be switched to a fourth drive mode in which the power distribution to the front wheels or the rear wheels is greater than that to the other wheels.

In the illustrated embodiment, the present invention is applied to a four-wheel drive vehicle that mounts the engine in the front and drives the front wheels in the two-wheel drive mode. However, the position of the engine is not limited. That is, the present invention may be applied to a vehicle that mounts the engine in the front and drives the rear wheel in the two-wheel drive mode. Alternatively, the present invention may be applied to a vehicle that mounts the engine in the rear and drives the rear wheels in the two-wheel drive mode.

Therefore, the present examples and embodiments are to be considered as illustrative and not restrictive and the invention is not to be limited to the details given herein, but may be modified within the scope and equivalence of the appended claims.

What is claimed is:

1. A power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, wherein the other wheels are second wheels that are coupled to the engine through the coupling device, wherein the apparatus determines a command value that corresponds to a driving state of the vehicle, wherein the frictional force of the coupling device determines the power distribution ratio to the first wheels and the second wheels, and wherein the frictional force of the coupling device is changed based on the command value, the apparatus comprising:

detecting means for detecting the differential rotation speed between the rotation speed of the front wheels and the rotation speed of the rear wheels;

estimating means for estimating the exothermic energy generated in the coupling device based on the product of the differential rotation speed and the command value;

selecting means for determining an optimum drive mode for the four-wheel drive vehicle based on the estimated exothermic energy and for selecting map data corresponding to the determined drive mode; and determining means for determining the command value that corresponds to the driving state by using the map data.

2. The apparatus according to claim 1, wherein the differential rotation speed is the difference between the average rotation speed of the front wheels and the average rotation speed of the rear wheels.

3. The apparatus according to claim 1, wherein, to determine the optimum drive mode for the four-wheel vehicle, the selecting means compares the exothermic energy with at least one determination threshold value.

4. The apparatus according to claim 3, wherein the drive mode is one of a plurality of drive modes that include a first four-wheel drive mode and a second four-wheel drive mode, wherein the power distribution ratio to the first wheels and the second wheels is closer to the equalized state in the first four-wheel drive mode than in the second four-wheel drive mode, wherein the determination threshold value is a temperature rise threshold value that is referred to during the first four-wheel drive mode, and wherein, if the exothermic energy is equal to or greater than the temperature rise threshold value when the drive mode is the second four-wheel drive mode, the selecting means switches the drive mode to the first four-wheel drive mode.

5. The apparatus according to claim 3, wherein the drive mode is one of a plurality of drive modes that include a four wheel drive mode, in which the first wheels and the second wheels are driven, and a two-wheel drive mode, in which only the first wheels are driven, wherein the determination threshold value is a temperature rise threshold value that is referred to during the four-wheel drive mode, and wherein, if the exothermic energy is equal to or greater than the temperature rise threshold value when the drive mode is the four-wheel drive mode, the selecting means switches the drive mode to the two-wheel drive mode.

6. The apparatus according to claim 3, wherein the drive mode is one of a plurality of drive modes that include a four wheel drive mode, in which the first wheels and the second wheels are driven, and a two-wheel drive mode, in which only the first wheels are driven, wherein the determination threshold value is a temperature drop threshold value that is referred to during the two-wheel drive mode, and wherein, if the exothermic energy is equal to or less than the temperature drop threshold value when the drive mode is the two-wheel drive mode, the selecting means switches the drive mode to the four-wheel drive mode.

7. The apparatus according to claim 3, wherein the drive mode is one of a plurality of drive modes that include a first four-wheel drive mode and a second four-wheel drive mode, wherein the power distribution ratio to the first wheels and the second wheels is closer to the equalized state in the first four-wheel drive mode than in the second four-wheel drive mode, wherein the determination threshold value is a temperature drop threshold value that is referred to during the first four-wheel drive mode, and wherein, if the exothermic energy is equal to or less than the temperature drop threshold value when the drive mode is the first four-wheel drive mode, the selecting means switches the drive mode to the second four-wheel drive mode.

8. The apparatus according to claim 3, wherein the drive mode is one of a plurality of drive modes that include a first four-wheel drive mode, a second four-wheel drive mode, and a two-wheel drive mode, wherein the power distribution ratio to the first wheels and the second wheels is closer to the equalized state in the first four-wheel drive mode than in the second four-wheel drive mode, wherein, in the two-wheel drive mode, only the first wheels are driven, wherein the determination threshold value is at least one of a plurality of threshold values that include a temperature rise threshold value and a temperature drop threshold value, which is less than the temperature rise threshold value, wherein, if the exothermic energy is equal to or greater than the temperature rise threshold value when the drive mode is the first four-wheel drive mode, the selecting means switches the drive mode to the two-wheel drive mode, and wherein, if the exothermic energy is equal to or less than the temperature drop threshold value when the drive mode is the two-wheel drive mode, the selecting means switches the drive mode to the second four-wheel drive mode.

9. A power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, wherein the other wheels are second wheels that are coupled to the engine through the coupling device, wherein the apparatus determines a command value that corresponds to the driving state of the vehicle, wherein the frictional force of the coupling device determines the power distribution ratio to the first wheels and the second wheels, and wherein the frictional force of the coupling device is changed based on the command value, wherein the apparatus: detects the differential rotation speed between the rotation speed of the front wheels and the rotation speed of the rear wheels; estimates the exothermic energy generated in the coupling device based on the product of the differential rotation speed and the command value; determines an optimum drive mode for the four-wheel drive vehicle based on the estimated exothermic energy and selects map data corresponding to the determined drive mode; and determines the command value that corresponds to the driving state by using the map data.

10. The apparatus according to claim 9, wherein the differential rotation speed is the difference between the average rotation speed of the front wheels and the average rotation speed of the rear wheels.

11. The apparatus according to claim 9, wherein, to determine the optimum drive mode for the four-wheel vehicle, the apparatus compares the exothermic energy with at least one determination threshold value.

12. The apparatus according to claim 11, wherein the drive mode is one of a plurality of drive modes that include a first four-wheel drive mode and a second four-wheel drive mode, wherein the power distribution ratio to the first wheels and the second wheels is closer to the equalized state in the first four-wheel drive mode than in the second four-wheel drive mode, wherein the determination threshold value is a temperature rise threshold value that is referred to during the first four-wheel drive mode, and wherein, if the exothermic energy is equal to or greater than the temperature rise threshold value when the drive mode is the second four-wheel drive mode, the apparatus switches the drive mode to the first four-wheel drive mode.

13. The apparatus according to claim 11, wherein the drive mode is one of a plurality of drive modes that include a four wheel drive mode, in which the first wheels and the second wheels are driven, and a two-wheel drive mode, in which only the first wheels are driven, wherein the determination threshold value is a temperature rise threshold value that is referred to during the four-wheel drive mode, and wherein, if the exothermic energy is equal to or greater than the temperature rise threshold value when the drive mode is the four-wheel drive mode, the apparatus switches the drive mode to the two-wheel drive mode.

14. The apparatus according to claim 11, wherein the drive mode is one of a plurality of drive modes that include a four wheel drive mode, in which the first wheels and the second wheels are driven, and a two-wheel drive mode, in which only the first wheels are driven, wherein the determination threshold value is a temperature drop threshold value that is referred to during the two-wheel drive mode, and wherein, if the exothermic energy is equal to or less than the temperature drop threshold value when the drive mode is the two-wheel drive mode, the apparatus switches the drive mode to the four-wheel drive mode.

15. The apparatus according to claim 11, wherein the drive mode is one of a plurality of drive modes that include a first four-wheel drive mode and a second four-wheel drive mode, wherein the power distribution ratio to the first wheels and the second wheels is closer to the equalized state in the first four-wheel drive mode than in the second four-wheel drive mode, wherein the determination threshold value is a temperature drop threshold value that is referred to during the first four-wheel drive mode, and wherein, if the exothermic energy is equal to or less than the temperature drop threshold value when the drive mode is the first four-wheel drive mode, the apparatus switches the drive mode to the second four-wheel drive mode.

16. The apparatus according to claim 11, wherein the drive mode is one of a plurality of drive modes that include a first four-wheel drive mode, a second four-wheel drive mode, and a two-wheel drive mode, wherein the power distribution ratio to the first wheels and the second wheels is closer to the equalized state in the first four-wheel drive mode than in the second four-wheel drive mode, wherein, in the two-wheel drive mode, only the first wheels are driven, wherein the determination threshold value is at least one of a plurality of threshold values that include a temperature rise threshold value and a temperature drop threshold value, which is less than the temperature rise threshold value, wherein, if the exothermic energy is equal to or greater than the temperature rise threshold value when the drive mode is the first four-wheel drive mode, the apparatus switches the drive mode to the two-wheel drive mode, and wherein, if the exothermic energy is equal to or less than the temperature drop threshold value when the drive mode is the two-wheel drive mode, the apparatus switches the drive mode to the second four-wheel drive mode.

17. A method for controlling a power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, and wherein the other wheels are second wheels that are coupled to the engine through the coupling device, wherein the apparatus determines a command value that corresponds to the driving state of the vehicle, wherein the frictional force of the coupling device determines the power distribution ratio to the first wheels and the second wheels, and wherein the frictional force of the coupling device is changed based on the command value, the method comprising:

detecting the differential rotation speed between the average rotation speed of the front wheels and the average rotation speed of the rear wheels;

estimating the exothermic energy generated in the coupling device based on the product of the differential rotation speed and the command value;

determining an optimum drive mode for the four-wheel drive vehicle based on the estimated exothermic energy and selecting map data corresponding to the determined drive mode; and     determining the command value that corresponds to the driving state by using the map data.

18. A power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, wherein the other wheels are second wheels that are coupled to the engine through the coupling device, wherein the apparatus determines a command value that corresponds to a driving state of the vehicle, wherein the frictional force of the coupling device determines the power distribution ratio to the first wheels and the second wheels, and wherein the frictional force of the coupling device is changed based on the command value, the apparatus comprising:

detecting means for detecting the differential rotation speed between the rotation speed of the front wheels and the rotation speed of the rear wheels;

estimating means for estimating the exothermic energy generated in the coupling device based on the product of the differential rotation speed and the command value;

selecting means for determining an optimum drive mode for the four-wheel drive vehicle from a plurality of drive modes based on the estimated exothermic energy and for selecting map data corresponding to the determined drive mode, wherein the selecting means compares the exothermic energy with at least one of a predetermined plurality of determination threshold values;

determining means for determining the command value that corresponds to the driving state by using the map data; and     wherein the drive modes include a first four-wheel drive mode, a second four-wheel drive mode, and a two-wheel drive mode, wherein the power distribution ratio to the first wheels and the second wheels is closer to the equalized state in the first four-wheel drive mode than in the second four-wheel drive mode, wherein, in the two-wheel drive mode, only the first wheels are driven, wherein the determination threshold values include a first temperature rise threshold value and a second temperature rise threshold value, which is greater than the first temperature rise threshold value, wherein, if the exothermic energy is equal to or greater than the first temperature rise threshold value when the drive mode is the second four-wheel drive mode, the selecting means switches the drive mode to the first four-wheel drive mode, and wherein, if the exothermic energy is equal to or greater than the second temperature rise threshold value when the drive mode is the first four-wheel drive mode, the selecting means switches the drive mode to the two-wheel drive mode.

19. A power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, wherein the other wheels are second wheels that are coupled to the engine through the coupling device, wherein the apparatus determines a command value that corresponds to a driving state of the vehicle, wherein the frictional force of the coupling device determines the power distribution ratio to the first wheels and the second wheels, and wherein the frictional force of the coupling device is changed based on the command value, the apparatus comprising:

detecting means for detecting the differential rotation speed between the rotation speed of the front wheels and the rotation speed of the rear wheels;

estimating means for estimating the exothermic energy generated in the coupling device based on the product of the differential rotation speed and the command value;

selecting means for determining an optimum drive mode for the four-wheel drive vehicle from a plurality of drive modes based on the estimated exothermic energy and for selecting map data corresponding to the determined drive mode, wherein the selecting means compares the exothermic energy with at least one of a predetermined plurality of determination threshold values;

determining means for determining the command value that corresponds to the driving state by using the map data; and     wherein the drive modes include a first four-wheel drive mode, a second four-wheel drive mode, and a two-wheel drive mode, wherein the power distribution ratio to the first wheels and the second wheels is closer to the equalized state in the first four-wheel drive mode than in the second four-wheel drive mode, wherein, in the two-wheel drive mode, only the first wheels are driven, wherein the determination threshold values include a first temperature rise threshold value, a second temperature rise threshold value, a first temperature drop threshold value and a second temperature threshold value, wherein the values increase in the order of the second temperature drop threshold value, the first temperature rise threshold value, the first temperature drop threshold value, and the second temperature rise threshold value, wherein, if the exothermic energy is equal to or greater than the first temperature rise threshold value when the drive mode is the second four-wheel drive mode, the selecting means switches the drive mode to the first four-wheel drive mode, wherein, if the exothermic energy is equal to or greater than the second temperature rise threshold value when the drive mode is the first four-wheel drive mode, the selecting means switches the drive mode to the two-wheel drive mode, wherein, if the exothermic energy is equal to or less than the first temperature drop threshold value when the drive mode is the two-wheel drive mode, the selecting means switches the drive mode to the first four-wheel drive mode, and wherein, if the exothermic energy is equal to or less than the second temperature drop threshold value when the drive mode is the first four-wheel drive mode, the selecting means switches the drive mode to the second four-wheel drive mode.

20. A power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, wherein the other wheels are second wheels that are coupled to the engine through the coupling device, wherein the apparatus determines a command value that corresponds to a driving state of the vehicle, wherein the frictional force of the coupling device determines the power distribution ratio to the first wheels and the second wheels, and wherein the frictional force of the coupling device is changed based on the command value, the apparatus: detects the differential rotation speed between the rotation speed of the front wheels and the rotation speed of the rear wheels; estimates the exothermic energy generated in the coupling device based on the product of the differential rotation speed and the command value; determines an optimum drive mode for the four-wheel drive vehicle from a plurality of drive modes based on the estimated exothermic energy and for selecting map data corresponding to the determined drive mode, wherein the apparatus compares the exothermic energy with at least one of a predetermined plurality of determination threshold values; and wherein the drive modes include a first four-wheel drive mode, a second four-wheel drive mode, and a two-wheel drive mode, wherein the power distribution ratio to the first wheels and the second wheels is closer to the equalized state in the first four-wheel drive mode than in the second four-wheel drive mode, wherein, in the two-wheel drive mode, only the first wheels are driven, wherein the determination threshold values include a first temperature rise threshold value and a second temperature rise threshold value, which is greater than the first temperature rise threshold value, wherein, if the exothermic energy is equal to or greater than the first temperature rise threshold value when the drive mode is the second four-wheel drive mode, the apparatus switches the drive mode to the first four-wheel drive mode, and wherein, if the exothermic energy is equal to or greater than the second temperature rise threshold value when the drive mode is the first four-wheel drive mode, the apparatus switches the drive mode to the two-wheel drive mode.

21. A power distribution control apparatus for a four-wheel drive vehicle, wherein the vehicle includes a pair of front wheels and a pair of rear wheels, the wheels being driven by an engine, and a coupling device that changes the power distribution to the front wheels and the rear wheels, wherein the front wheels or the rear wheels are first wheels that are coupled to the engine without the coupling device in between, wherein the other wheels are second wheels that are coupled to the engine through the coupling device, wherein the apparatus determines a command value that corresponds to a driving state of the vehicle, wherein the frictional force of the coupling device determines the power distribution ratio to the first wheels and the second wheels, and wherein the frictional force of the coupling device is changed based on the command value, the apparatus: detects the differential rotation speed between the rotation speed of the front wheels and the rotation speed of the rear wheels; estimates the exothermic energy generated in the coupling device based on the product of the differential rotation speed and the command value; an optimum drive mode for the four-wheel drive vehicle from a plurality of drive modes based on the estimated exothermic energy and for selecting map data corresponding to the determined drive mode, wherein the apparatus compares the exothermic energy with at least one of a predetermined plurality of determination threshold values; and determines the command value that corresponds to the driving state by using the map data; and wherein the drive modes include a first four-wheel drive mode, a second four-wheel drive mode, and a two-wheel drive mode, wherein the power distribution ratio to the first wheels and the second wheels is closer to the equalized state in the first four-wheel drive mode than in the second four-wheel drive mode, wherein, in the two-wheel drive mode, only the first wheels are driven, wherein the determination threshold values include a first temperature rise threshold value, a second temperature rise threshold value, a first temperature drop threshold value and a second temperature threshold value, wherein the values increase in the order of the second temperature drop threshold value, the first temperature rise threshold value, the first temperature drop threshold value, and the second temperature rise threshold value, wherein, if the exothermic energy is equal to or greater than the first temperature rise threshold value when the drive mode is the second four-wheel drive mode, the apparatus switches the drive mode to the first four-wheel drive mode, wherein, if the exothermic energy is equal to or greater than the second temperature rise threshold value when the drive mode is the first four-wheel drive mode, the apparatus switches the drive mode to the two-wheel drive mode, wherein, it the exothermic energy is equal to or less than the first temperature drop threshold value when the drive mode is the two-wheel drive mode, the apparatus switches the drive mode to the first four-wheel drive mode, and wherein, it the exothermic energy is equal to or less than the second temperature drop threshold value when the drive mode is the first four-wheel drive mode, the apparatus switches the drive mode to the second four-wheel drive mode.

* * * * *